3,146,161
2,3-DIMERCAPTO-QUINOXALINES AS SYNERGISTS FOR FUNGICIDAL AGENTS
Ferdinand Grewe, Cologne-Stammheim, Helmuth Kaspers, Leverkusen, Klaus Sasse, Cologne-Stammheim, and Richard Wegler, Leverkusen, Germany, assignors to Farbenfabriken Bayer Aktiengesellschaft, Leverkusen, Germany, a corporation of Germany
No Drawing. Filed Apr. 4, 1961, Ser. No. 100,517
Claims priority, application Germany Apr. 9, 1960
2 Claims. (Cl. 167—33)

The present invention relates to and has as its objects new and useful fungicidal agents and methods of combating plant damaging fungi therewith. Generally the active ingredients of these new agents are mixtures of 2,3-dimercapto-quinoxalines or salts thereof and other known fungicidal agents.

The dimercapto-quinoxalines are to be understood being compounds of the following general formula

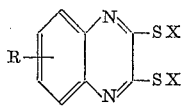

wherein X represents hydrogen or broadly a cationic salt-forming organic or inorganic radical and R stands possibly for one or more substituents of the benzenic nucleus. Known fungicidal agents in the meaning of this invention include both organic or inorganic compounds of this type but preferably are of organic nature.

From U.S. patent application Serial No. 823,825, now U.S. Patent No. 3,091,613, filed June 30, 1959, there are known fungicidal compositions which contain as active substances against phytopathogenic fungi acylation products of 2,3-dimercapto-quinoxaline and its derivatives substituted in the nucleus.

These acylation products of 2,3-dimercapto-quinoxaline possess good preventive or therapeutic activities when used alone against plant diseases brought about by various types of the genuine mildew fungi, but are little or not active against other fungal diseases.

But further investigations in this field, it has now been found that 2,3-dimercapto-quinoxalines as well as its derivatives substituted in the nucleus and also their salts enable the fungicidal potency of known active compounds against phytopathogenic fungi to be substantially enhanced. This result is especially surprising since the free 2,3-dimercapto-quinoxalines and their salts alone do not influence the growth of fungi of the genuine mildew class nor that of other phytopathogenic types. A synergistic increase in the action of plant protecting and pest control agents is well known for insecticides, but hardly any compound has hitherto been found which substantially improve fungicides in an economically significant manner.

It has also been found that compositions of at least one known fungicidal active substance such as N-trichloromethylthio-tetrahydrophthalimide, zinc ethylene-bis-dithiocarbamate, zinc-dimethyl-dithiocarbamate, tetramethyl - thiuram - disulfide, 1 - chloro - 2,4 - dinitronaphthalene or pentachlorophenol, with at least one 2,3-dimercapto-quinoxaline optionally substituted in the nucleus or one of its salts, possess higher protective and some even eradicative fungicidal properties compared with single active substances against plant-damaging fungi such as *Phytophthora infestans*, *Peronospora niticola* (*Plasmopara viticola*), *Cladosporium fulvum*, *Fusicladium denticium*, *Septoria apii*, *Alternaria solani* etc. so that substantially smaller quantities of the aforesaid compositions are to be used in order to attain equal effects on the plants.

The 2,3-dimercapto-quinoxalines to be used according to this invention are those 2,3-dimercapto-quinoxalines in which the two —SH-groups are free. They may be furthermore substituted in the benzene nucleus, for example, also by lower alkyl, alkoxy, alkylmercapto or nitro groups, or by halogen, sulfonic acid or carboxylic acid groups. Furthermore, their salts may also be employed, for example, the alkali or ammonium metal salts in water-soluble form, but generally more advantageously in barely soluble form, especially zinc, ferric, manganic or mercury salts as well as salts of primary, secondary or tertiary amines, such as dimethylamine, ethylamine, butylamine, hexylamine, dihexylamine, dodecylamine, stearylamine, methyl-stearylamine and the like, but preferably those with long-chain aliphatic radicals.

Finally, it is also possible to combine a free dimercapto-quinoxaline or one of its readily or moderately water-soluble salts with, for example, a readily soluble heavy metal salt so that a barely soluble salt of the dimercapto-quinoxaline is subsequently formed during the mixing or application.

The proportions in which the known fungicidal and the activating components are mixed may vary within wide limits. In practice it is dependent on the conditions prevailing in each case such as the degree of the infestation to be expected, the fungicidal potency of the active substance proper, as well as on the economical point of view.

The following examples are given for the purpose of illustrating the present invention.

EXAMPLE 1

As may be seen in the following Table I, the amount of zinc ethylene-bis-dithiocarbamate (zineb) may be decreased by at least 25% when used for combating *Phytophthora infestans* on tomato plants if, instead of a pure zineb preparation a mixed preparation of zineb and the zinc salt of 2,3-dimercapto-quinoxaline is used in a mixing ratio of 30:1.

The preparations of the aforesaid agents were prepared by using wettable powders, i.e. clay formulations containing additionally a commercial emulsifier such as nonylphenolpolyglycolether (NP 10), in the above formulations 10% of wetting agent were present in the powders.

The following experiments have been carried out:

Young tomato plants (of the variety "Bonny Best") were sprayed with the appropriate doses of aqueous suspensions of the preparation, then allowed to dry and, after 24 hours, together with untreated plants artificially inoculated, with a spore suspension of *Phytophthora infestans*. Under optimum conditions as to moisture and temperature in the hothouse, the infestation was determined in percentages of the untreated control plants after incubation of the inoculated, sprayed and non-sprayed plants. Between incubation and evaluation 3 days passed in the case of Alternaria, and 6 days in the case of Phytophthora.

Table I

The action of zinc ethylene-bis-dithiocarbamate (zineb) on *Phytophthora infestans* as compared with a mixture of zinc ethylene-bis-dithiocarbamate and 2,3-dimercapto-quinoxaline zinc salt (Zn salt) according to this invention.

| Preparation | Mixing ratio Zineb Zn salt | Tested Zineb conc. Percent | Degree of infestation of tomato plants in percent of control plants (=100) after spraying with a Zineb suspension in Percent |
|---|---|---|---|
| Pure Zineb agent | | 0.025 | 4 |
| | | 0.0125 | 11 |
| | | 0.0062 | 40 |
| Composition agent A | 30:1 | 0.018 | 3 |
| | | 0.009 | 8 |
| | | 0.0045 | 26 |
| Untreated control plants | | | 100 |

Similar good results were obtained when mixtures of zinc ethylene-bis-dithiocarbamate and zinc-2,3-dimercapto-quinoxaline were used in a ratio of 10:1, 20:1 and 50:1. Instead of the Zn-salt of 2,3-dimercapto-quinoxaline also the free mercaptane itself may be used. Also the manganese salt, the nickel salt, the ferric salt, the mercuric salt, the tin salt, the sodium salt and the dodecylamino salt gave similar good results.

EXAMPLE 2

The superiority of the inventive preparation is also to be seen in the following case, when tetramethyl-thiuramdisulfide (TMTD) is used as fungicide. As may be derived from the figures of Table II, mixtures according to the invention of TMTD and various 2,3-dimercapto-quinoxalines in a ratio of 6:1 are practically twice as effective against *Alternaria solani* than a TMTD preparation alone. Tests have been conducted as said in Example 1.

Table II

Action against *Alternaria solani* of tetramethyl-thiuramdisulfide (TMTD) in comparison with mixtures of tetramethylthiuram disulfide and 2,3-dimercapto-quinoxalines.

| Preparation | Quinoxaline compound added | Mixing ratio, TMTD: quinoxaline compound | Infestation degree of tomato plants in percent of control plants (=100) after spraying with percent TMTD suspension | | |
|---|---|---|---|---|---|
| | | | 0.05 | 0.025 | 0.0125 |
| Pure TMTD agent | | | 26 | 38 | |
| Combination preparation: | | | | | |
| A | 2,3-dimercapto-quinoxaline. | 6:1 | | 19 | 32 |
| B | 2,3-dimercapto-quinoxaline zinc salt. | 6:1 | | 21 | 29 |
| C | 2,3-dimercapto-quinixaline-dodecylamine salt. | 6:1 | | 17 | 28 |
| Untreated control plants. | | | | 100 | |

When instead of TMTD zinc-dimethyl-dithiocarbamate has been used with zinc-2,3-dimercapto-quinoxaline in a ratio between 5:1 and 25:1, there have been obtained far better results than with the first mentioned TMTD alone.

EXAMPLE 3

Effective combating of *Phytophthora infestans* on tomato plants under optimum infection conditions in the hothouse becomes possibly inter alia as shown in the following example (see Table III) when the zinc salt of 2,3-dimercapto-quinoxaline is added to the tetramethyl-thiuram-disulfide (TMTD) in a ratio of 10:1, 20:1 and 40:1 respectively. The action of two mixed preparation is twice as strong as the action of the pure TMTD preparation. Tests again have been carried as stated above.

Table III

Action of tetramethyl-thiurman-disulfide (TMTD) against *Phytophthora infestans* as compared with mixtures of tetramethyl-thiuram-disulfide and 2,3-dimercapto-quinoxaline zinc salt (Zn salt) with differing mixing proportions.

| Preparation | Mixing ratio, TMTD: Zn salt | Infestation degree of tomato plants in percent of control plants (=100) after spraying with suspension, percent TMTD | | |
|---|---|---|---|---|
| | | 0.05 | 0.025 | 0.0125 |
| Pure TMTD agent | | 15 | 30 | 55 |
| Combination preparation: | | | | |
| A | 10:1 | 7 | 12 | 29 |
| B | 20:1 | 8 | 15 | 26 |
| C | 40:1 | 9 | 12 | 35 |
| Untreated control | | | 100 | |

Also pentachlorophenol, N-trichloro-methyl-thio-(tetrahydro)-phthalimide which are well known practical fungicides, are improved when used together with 2,3-dimercapto-quinoxaline, its zinc or manganese salt or its stearyl-amine salt in a ratio between 3:1 and 50:1.

Practical application of all the compositions is carried out in practice in conventional manner as sprays or dusts, whereby diluents, emulsifiers, adhesives, wetting agents and the like may be added. Moreover, a combination with other bactericides and/or insecticides is possible.

We claim:

1. A method of combating fungi, comprising contacting a plant with an organic funicidal composition comprising an active fungicidal component selected from the group consisting of zinc - ethylene - bis - dithiocarbamate, tetramethyl - thiuram disulfide, zinc-dimethyl-dithiocarcarbamate, pentachlorophenol, N - trichloromethyl - thio-tetrahydro - phthalimide, and 1 - chloro - 2,4 - dinitronaphthalene, in admixture with at least one dimercapto quinoxaline of the formula

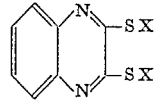

wherein X is a member selected from the group consisting of hydrogen, zinc, manganese, nickel, ferric iron, mercury, tin, sodium, dodecylamino, and stearylamino grouping, the fungicidal component and the quinoxaline being present in a ratio of about 3–50:1.

2. A synergistic fungicidal composition containing an active fungicidal component selected from the group consisting of zinc ethylene-bis-dithiocarbamate, tetramethyl-thiuram-disulfide, zinc-dimethyl-dithiocarbamate, pentachloro-phenol, N-trichloro-methyl-thio-tetrahydro-phthalimide, and 1-chloro-2,4-dinitronaphthalene, in admixture with at least one dimercapto quinoxaline of the formula

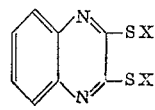

wherein X is a member selected from the group consisting of hydrogen, zinc, manganese, nickel, ferric iron, mercury, tin, sodium, dodecylamino, and stearylamino grouping, the fungicidal component and the quinoxaline being present in a ratio of about 3–50:1.

References Cited in the file of this patent

UNITED STATES PATENTS

| | | |
|---|---|---|
| 3,091,613 | Sasse et al. | May 28, 1963 |
| 3,095,413 | Sasse et al. | June 25, 1963 |